US012068515B2

(12) United States Patent
Park et al.

(10) Patent No.: US 12,068,515 B2
(45) **Date of Patent: *Aug. 20, 2024**

(54) CAVITY FILTER COMPRISING AN ELASTICALLY DEFORMABLE TERMINAL PORTION, WHERE A FIRST SIDE TERMINAL IS INSERTED INTO A HOUSING OF A SECOND SIDE TERMINAL OF THE TERMINAL PORTION

(71) Applicant: KMW INC., Hwaseong-si (KR)

(72) Inventors: Nam Shin Park, Hwaseong-si (KR); Joung Hoe Kim, Hwaseong-si (KR); Sung Ho Jang, Yongin-si (KR)

(73) Assignee: KMW INC., Hwaseong-si (KR)

( * ) Notice: Subject to any disclaimer, the term of this patent is extended or adjusted under 35 U.S.C. 154(b) by 800 days.

This patent is subject to a terminal disclaimer.

(21) Appl. No.: 17/120,095

(22) Filed: Dec. 11, 2020

(65) Prior Publication Data

US 2021/0098849 A1 Apr. 1, 2021

Related U.S. Application Data

(63) Continuation of application No. PCT/KR2019/007083, filed on Jun. 12, 2019.

(30) Foreign Application Priority Data

Jun. 12, 2018 (KR) ........................ 10-2018-0067400
Jun. 12, 2019 (KR) ........................ 10-2019-0069127

(51) Int. Cl.
*H01P 1/04* (2006.01)
*H01P 1/207* (2006.01)
(Continued)

(52) U.S. Cl.
CPC .............. *H01P 1/045* (2013.01); *H01P 1/207* (2013.01); *H01P 5/085* (2013.01); *H01R 13/24* (2013.01); *H01R 24/42* (2013.01); *H01R 2103/00* (2013.01)

(58) Field of Classification Search
CPC .......... H01P 1/045; H01P 5/085; H01P 1/207; H01P 1/20
(Continued)

(56) References Cited

U.S. PATENT DOCUMENTS 5,928,005 A 7/1999 Li et al.
6,166,615 A * 12/2000 Winslow et al. ......... H01P 1/04 333/260
(Continued)

FOREIGN PATENT DOCUMENTS

CN 102136616 A 7/2011
CN 204243344 U 4/2015
(Continued)

OTHER PUBLICATIONS

First office action mailed Aug. 31, 2021 from the Chinese Patent Office for Chinese Application No. 201980040134.7.
(Continued)

*Primary Examiner* — Benny T Lee
(74) *Attorney, Agent, or Firm* — Insight Law Group, PLLC; Seung Lee

(57) ABSTRACT

The present invention relates to a cavity filter and a connecting structure included therein. The cavity filter includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: first side terminal contacted with the electrode pad; and the second side terminal connected to the RF signal connecting portion,
(Continued)

wherein at least any one of the first side terminal and the second side terminal has a housing space in which the other side terminal is housed, and a part of the at least one side terminal is elastically deformed by an assembly force provided by an assembler, and applies lateral tension to the other side terminal while elastically supporting the other side terminal toward the electrode pad. Therefore, the cavity filter can efficiently absorb assembly tolerance which occurs through assembly design, and prevent disconnection of an electric flow, thereby preventing degradation in performance of an antenna device.

11 Claims, 19 Drawing Sheets

(51) Int. Cl.
*H01P 5/08* (2006.01)
*H01R 13/24* (2006.01)
*H01R 24/42* (2011.01)
*H01R 103/00* (2006.01)

(58) Field of Classification Search
USPC .................................................. 333/202, 260
See application file for complete search history.

(56) References Cited

U.S. PATENT DOCUMENTS

| | | | | |
|---|---|---|---|---|
| 11,495,870 | B2 * | 11/2022 | Park et al. | H01R 13/2421 |
| 11,876,273 | B2 * | 1/2024 | Park et al. | H01P 1/045 |
| 2003/0155989 | A1 | 8/2003 | Ling et al. | |
| 2015/0061794 | A1 | 3/2015 | Tong | |
| 2018/0131153 | A1 | 5/2018 | Flaherty, IV | |

FOREIGN PATENT DOCUMENTS

| | | | |
|---|---|---|---|
| CN | 204424413 | U | 6/2015 |
| CN | 206116672 | U | 4/2017 |
| CN | 108448213 | A | 8/2018 |
| CN | 211655005 | U | 10/2020 |
| JP | H07-336115 | A | 12/1995 |
| JP | 2007-006529 | A | 1/2007 |
| JP | 2015-511756 | A | 4/2015 |
| JP | 2015-095454 | A | 5/2015 |
| KR | 10-2010-0001571 | A | 1/2010 |
| KR | 10-2011-0041919 | A | 4/2011 |
| KR | 10-2018-0055772 | A | 5/2018 |
| KR | 10-1854309 | B1 | 5/2018 |
| TW | 201214844 | A | 4/2012 |
| WO | 2006/134901 | A1 | 1/2009 |
| WO | 2018/093176 | A2 | 5/2018 |

OTHER PUBLICATIONS

Extended European Search Report mailed Feb. 10, 2022 for European Application No. 19819660.2.
First office action mailed Jan. 18, 2022 for Japanese Application No. 2020-568965.
International Search Report for PCT/KR2019/007083 mailed Sep. 23, 2019 and its English translation.
Extended European Search Report mailed on Feb. 19, 2024 from the European Patent Office for European Application No. 23208029.1.

* cited by examiner

CAVITY FILTER COMPRISING AN ELASTICALLY DEFORMABLE TERMINAL PORTION, WHERE A FIRST SIDE TERMINAL IS INSERTED INTO A HOUSING OF A SECOND SIDE TERMINAL OF THE TERMINAL PORTION

CROSS-REFERENCE TO RELATED APPLICATIONS

This application is a Continuation Application of International Application No. PCT/KR2019/007083, filed on Jun. 12, 2019, which claims priority and benefits of Korean Application Nos. 10-2018-0067400, filed on Jun. 12, 2018, and 10-2019-0069127, filed on Jun. 12, 2019, the disclosures of which are incorporated herein by reference in their entirety.

TECHNICAL FIELD

The present invention relates to a cavity filter and a connecting structure included therein, and more particularly, to a cavity filter for a massive MIMO (Multiple Input Multiple Output) antenna, which improves a connector fastening structure between a filter and a PCB (Printed Circuit Board) in consideration of assembly performance and size, and a connecting structure included therein.

BACKGROUND ART

The contents described in this section simply provide background information on the present disclosure, and do not constitute the related art.

MIMO (Multiple Input Multiple Output) refers to a technology capable of significantly increasing a data transmission capacity by using a plurality of antennas, and is a spatial multiplexing technique in which a transmitter transmits different data through respective transmitting antennas and a receiver sorts the transmitted data through a suitable signal processing operation. Therefore, when the number of transmitting antennas and the number of receiving antennas are increased at the same time, the channel capacity may be raised to transmit more data. For example, when the number of antennas is increased to 10, it is possible to secure a channel capacity ten times larger than in a current single antenna system, even though the same frequency band is used.

In the 4G LTE-advanced technology, 8 antennas are used. According to the current pre-5G technology, a product having 64 or 128 antennas mounted therein is being developed. When the 5G technology is commercialized, it is expected that base station equipment with much more antennas will be used. This technology is referred to as "massive MIMO". Currently, cells are operated in a 2D manner. However, when the massive MIMO technology is introduced, 3D-beamforming becomes possible. Thus, the massive MIMO technology is also referred to as "FD (Full Dimension)-MIMO".

According to the massive MIMO technology, the numbers of transceivers and filters are increased with the increase in number of antennas. As of 2014, 200,000 or more base stations are installed in Korea. That is, there is a need for a cavity filter structure which is easily mounted while minimizing a mounting space. Furthermore, there is a need for an RF signal line connecting structure which provides the same filter characteristic even after individually tuned cavity filters are mounted in antennas.

An RF filter having a cavity structure includes a resonator provided in a box structure formed of a metallic conductor, the resonator being configured as a resonant bar or the like. Thus, the RF filter has only a natural frequency of electromagnetic field to transmit only a specific frequency, e.g. an ultra-high frequency, through resonance. A band pass filter with such a cavity structure has a low insertion loss and high power. Thus, the band pass filter is utilized in various manners as a filter for a mobile communication base station antenna.

SUMMARY OF THE INVENTION

Technical Problem

An object of the present invention is to provide a cavity filter which has a slimmer and more compact structure and includes an RF connector embedded in a filter body in a thickness direction thereof, and a connecting structure included therein.

Another object of the present invention is to provide a cavity filter which is assembled through an assembly method capable of minimizing the accumulation amount of assembly tolerance which occurs when a plurality of filters are assembled, and has an RF signal connection structure that can facilitate mounting and uniformly maintain the frequency characteristics of the filters, and a connecting structure included therein.

Still another object of the present disclosure is to provide a cavity filter which can prevent a signal loss by applying lateral tension while allowing a relative motion in the case of a separable RF pin, and a connecting structure therein.

Yet another object of the present disclosure is to provide a cavity filter which can maintain a constant contact area between two members to be electrically connected to each other, while absorbing assembly tolerance between the two members, and be installed through a clear and simple method, and a connecting structure included therein.

The technical problems of the present disclosure are not limited to the above-described technical problems, and other technical problems which are not mentioned can be 5 clearly understood by the person skilled in the art from the following descriptions.

Technical Solution

In one general aspect, a cavity filter includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: first side terminal contacted with the electrode pad; and the second side terminal connected to the RF signal connecting portion, wherein at least any one of the first side terminal and the second side terminal has a housing space in which the other of the first and second side terminals is housed, and a part of the at least one side terminal is elastically deformed by an assembly force provided by an assembler, and applies lateral tension to the other side terminal while elastically supporting the other side terminal toward the electrode pad.

The second side terminal may have the housing space in which a part of the first side terminal is housed.

The first side terminal may have a plurality of cut pieces formed at an outer circumferential surface thereof, and inclined and extended upwardly and outwardly.

The plurality of cut pieces may include: an elastic cut piece formed at an upper portion of the outer circumferential surface of the first side terminal, and extended outwardly so as to be locked to an outer circumferential edge of the housing space formed in the second side terminal; and a lateral tension cut piece formed at a lower portion of the outer circumferential surface of the first side terminal, and housed in the housing space of the second side terminal so as to apply an elastic force in a lateral direction with respect to the inner surface of the housing space.

The lateral tension cut piece may be formed to apply continuous lateral tension to the inner surface of the housing space.

A contact portion of the first side terminal, which is contacted with the electrode pad, may have a hemispherical cross-sectional shape.

A contact portion of the first side terminal, which is contacted with the electrode pad, may have a ring-shaped cross-sectional shape.

An upper end portion of the first side terminal may have a cut groove which is folded by an assembly force provided by an assembler.

An upper end portion of the second side terminal may be housed in the lower end portion of the first side terminal, and the first side terminal may have tension cut portions formed therein so as to be widened along the outer surface of the upper end portion of the second side terminal when the first side terminal is moved downward by an assembly force provided by an assembler.

The upper end portion of the second side terminal may be formed in a cone shape.

The upper end portion of the second side terminal may be formed in a shape obtained by cutting out a part of the cone-shaped upper end portion.

In another general aspect, a connecting structure includes: an RF signal connecting portion spaced apart, by a predetermined distance, from an outer member having an electrode pad provided on a surface thereof; and a terminal portion configured to electrically connect the electrode pad of the outer member and the RF signal connecting portion so as to absorb assembly tolerance existing at the predetermined distance and to prevent disconnection of the electric flow between the electrode pad and the RF signal connecting portion, wherein the terminal portion includes: first side terminal contacted with the electrode pad; and the second side terminal connected to the RF signal connecting portion, wherein at least any one of the first side terminal and the second side terminal has a housing space in which the other of the first and second side terminals is housed, and a part of the at least one side terminal is elastically deformed by an assembly force provided by an assembler, and applies lateral tension to the other side terminal while elastically supporting the other side terminal toward the electrode pad.

Advantageous Effects

In accordance with the embodiments of the present disclosure, the cavity filter may have a slimmer and more compact structure because the RF connector is embedded in the filter body in the thickness direction thereof, be assembled through an assembly method capable of minimizing the accumulation amount of assembly tolerance which occurs when a plurality of filters are assembled, facilitate the RF signal connection structure to be easily mounted and uniformly maintain the frequency characteristics of the filters, and provide stable connection by applying lateral tension while allowing a relative motion, thereby preventing degradation in antenna performance.

BEST MODE FOR CARRYING OUT THE INVENTION

Figure 1:
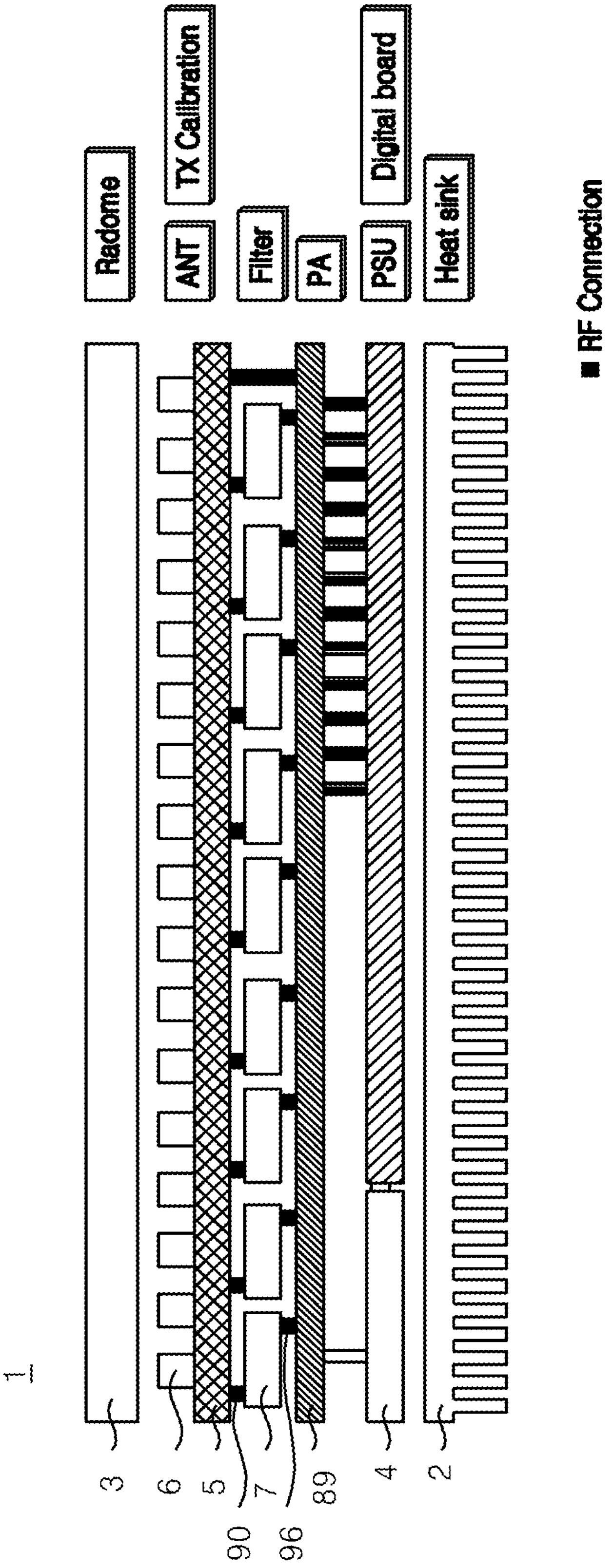
FIG. 1 is a diagram schematically illustrating a stacked structure of a massive MIMO antenna.

Hereafter, some embodiments of the present disclosure will be described in detail with reference to the accompanying drawings. It should be noted that, when components in each of the drawings are denoted by reference numerals, the same components are represented by like reference numerals, even though the components are displayed on different drawings. Furthermore, when it is determined that the detailed descriptions of publicly known components or functions related to the present disclosure disturb understandings of the embodiments of the present disclosure, the detailed descriptions thereof will be omitted herein.

When the components of the embodiments of the present disclosure are described, the terms such as "first", "second", "A", "B", "(a)" and "(b)" may be used. Each of such terms is only used to distinguish the corresponding component from other components, and the nature or order of the corresponding component is not limited by the term. Furthermore, all terms used herein, which include technical or scientific terms, may have the same meanings as those understood by those skilled in the art to which the present disclosure pertains, as long as the terms are not differently defined. Terms that are commonly used and defined in general dictionaries should be interpreted as having the same meaning as in the context of the relevant technology, and unless explicitly defined in this application, should not be interpreted in an idealistic or excessively formal manner.

FIG. 1 is a diagram schematically illustrating a stacked structure of a massive MIMO antenna.

FIG. 1 only illustrates an exemplary exterior of an antenna device 1 in which an antenna assembly including a cavity filter in accordance with an embodiment of the present disclosure is embedded, and does not limit the exterior of the antenna device 1 when components are actually stacked.

The antenna device 1 includes a housing 2 having a heat sink formed therein and a radome 3 coupled to the housing 2. Between the housing 2 and the radome 3, an antenna assembly may be embedded.

A PSU (Power Supply Unit) 4 is coupled to the bottom of the housing 2 through a docking structure, for example, and provides operation power for operating communication parts included in the antenna assembly.

Typically, the antenna assembly has a structure in which an equal number of cavity filters 7 to the number of antennas are disposed on a rear surface of an antenna board 5 having a plurality of antenna (ANT) elements 6 arranged on a front surface thereof, and a related PCB 89 is subsequently stacked. The cavity filters may be connected to the antenna board 5 via the connectors 90, and to the PCB 89 via the connectors 96, respectively. The cavity filters 7 may be thoroughly tuned and verified to individually have frequency characteristics suitable for the specification, and prepared before mounted on the antenna board 5. Such a tuning and verifying process may be rapidly performed in an environment with the same characteristics as the mounting state.

Figure 2:
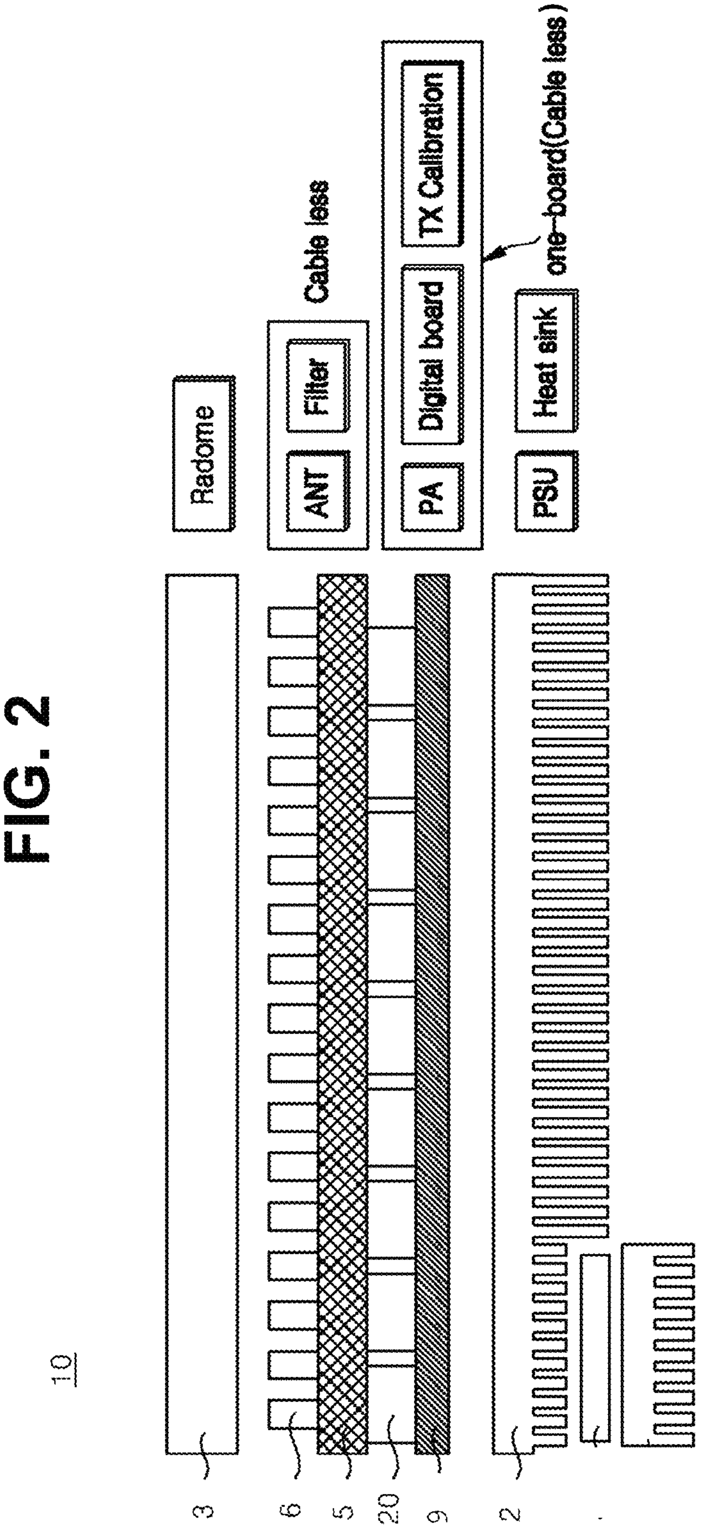
FIG. 2 is a cross-sectional view illustrating that a cavity filter in accordance with an embodiment of the present disclosure is stacked between an antenna board and a control board.

FIG. 2 is a cross-sectional view illustrating that a cavity filter in accordance with an embodiment of the present disclosure is stacked between an antenna board and a control board.

Referring to FIG. 2, a cavity filter 20 in accordance with the embodiment of the present disclosure may exclude a typical RF connector 90 illustrated in FIG. 1, which makes it possible to provide an antenna structure having a lower height profile while facilitating connection.

Furthermore, an RF connecting portion is disposed on either surface of the cavity filter 20 in the height direction thereof, and connected to the cavity filter 20 in accordance with the embodiment of the present disclosure. Thus, although an antenna (ANT) board 5 or a PCB board 9 is vibrated or thermally deformed, the RE connection is equally maintained without a change in frequency characteristic.

Figure 3:
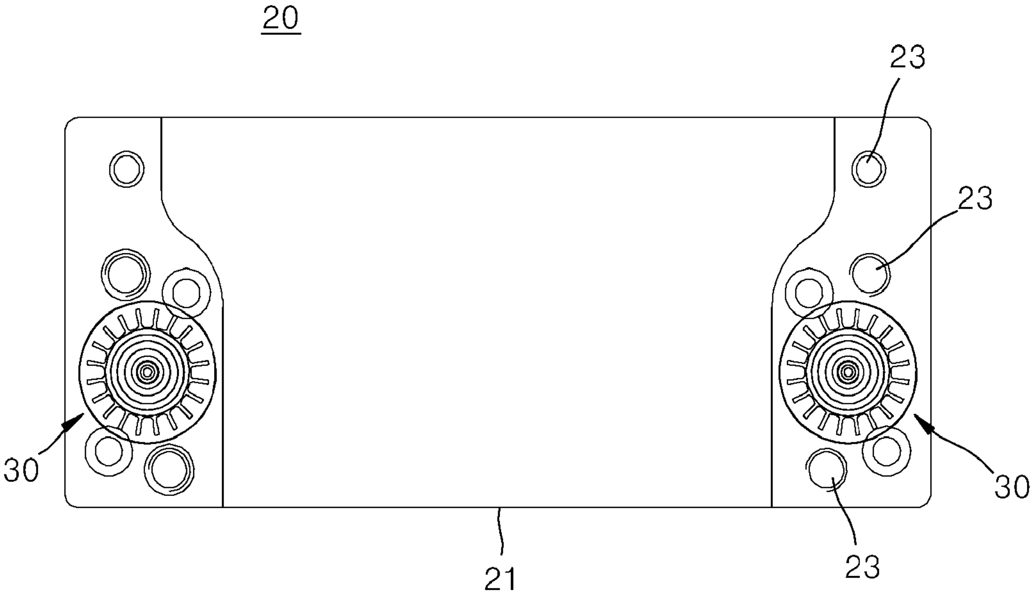
FIG. 3 is a plan perspective view of the structure of the cavity filter in accordance with the embodiment of the present disclosure, when seen from the bottom.

FIG. 3 is a plan perspective view of the structure of the cavity filter in accordance with the embodiment of the present disclosure, when seen from the bottom.

Figure 4:
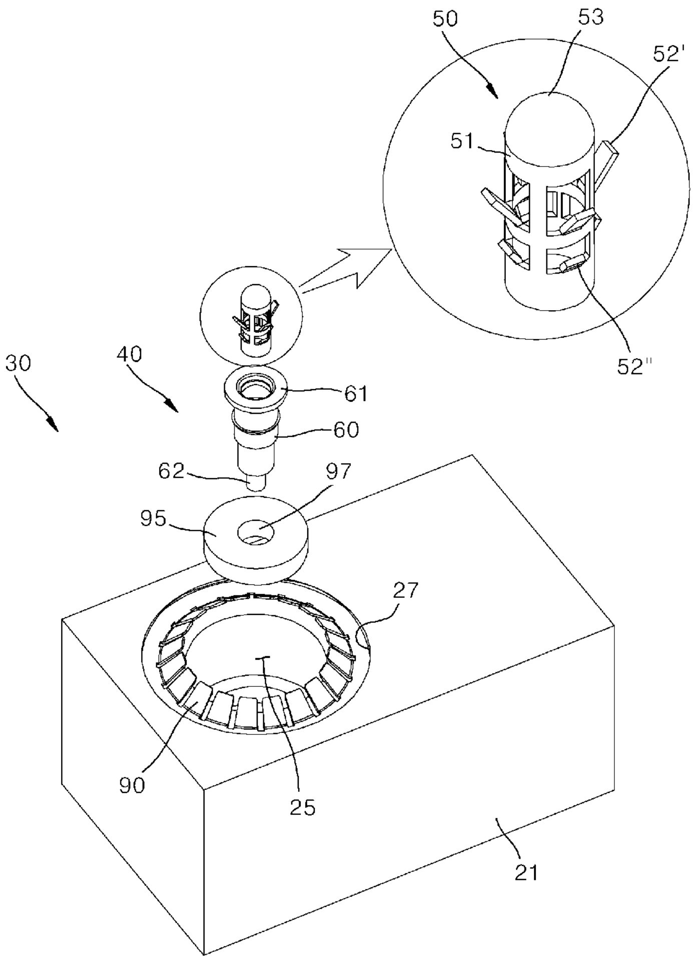
FIG. 4 is an exploded perspective view illustrating a cavity filter in accordance with a first embodiment of the present disclosure.
Figure 5:
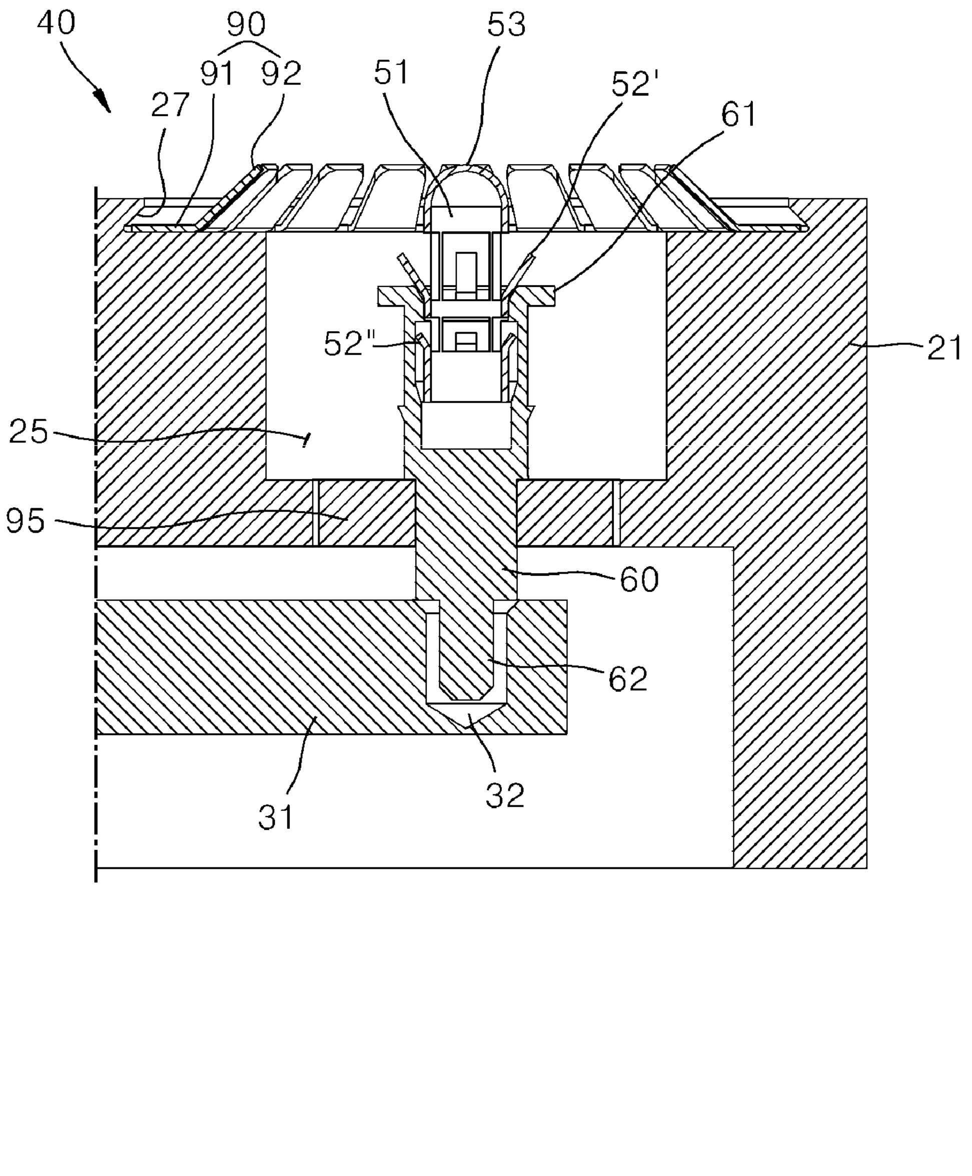
FIG. 5 is a cross-sectional view illustrating the cavity filter in accordance with the first embodiment of the present disclosure.

Referring to FIGS. 3 to 5, the cavity filter in accordance with the embodiment of the present disclosure includes an RF signal connecting portion (see reference numeral 31 in FIG. 5 and the subsequent drawings), a first case (with no reference numeral) having a hollow space therein, a second case (with no reference numeral) covering the first case, a terminal portion (see reference numeral 40 in FIG. 4) formed on either side of the first case in the longitudinal direction thereof and provided in the height direction of the cavity filter, and a filter module 30 including assembly holes 23 formed on both sides of the terminal portion 40. Referring to FIG. 5, the terminal portion 40 electrically connects an electrode pad (with no reference numeral) of an outer member 8 to the RF signal connecting portion 31 through a terminal insertion port 25 formed in the first case, the outer member 8 being configured as any one of an antenna board and a PCB board.

When the bottom of the terminal portion 40 in the drawings is supported by the RF signal connecting portion 31 and the outer member 8 configured as an antenna board or PCB board is closely coupled to the top of the terminal portion 40, the terminal portion 40 may be elastically supported while always contacted with the electrode pad formed on one surface of the outer member 8, thereby absorbing assembly tolerance existing in the terminal insertion port 25.

That is, as will be described below, the terminal portion 40 of the cavity filter in accordance with the embodiment of the present disclosure may be separated into a first side terminal and a second side terminal and implemented as various embodiments depending on a shape for applying lateral tension and a specific configuration for absorbing assembly tolerance.

More specifically, the terminal portion 40 may be provided as a separable terminal portion which includes two members separated as an upper portion and a lower portion as illustrated in FIGS. 4 and 5. In this case, a part of any one member of the two members may be inserted into a part of the other member.

Although not illustrated, when the cavity filter is provided as an integrated filter, the terminal portion 40 may be provided as an elastic body whose part is elastically deformed when a predetermined assembly force is supplied by an assembler, in order to absorb assembly tolerance. However, the integrated filter having the terminal portion 40 integrated therewith does not require a separate shape design for applying lateral tension, because it is not predicted that an electric flow from one end to the other end thereof will be disconnected.

However, when the terminal portion 40 is provided as a separable filter separated into two members, separate elastic cut pieces 52', 52" may be provided to absorb the assembly tolerance. Specifically, the whole length of the terminal portion 40 may be decreased while the predetermined assembly force moves a first side terminal 50 and a second side terminal 60, which are separated from each other, to overlap each other, and increased and restored to the original state when the assembly force is removed. However, since the first side terminal 50 and the second side terminal 60 of the terminal portion 40 are separated from each other, there's concern that electric flow will become interrupted when the first side terminal 50 and the second side terminal 60 are moved into overlapping positions. Therefore, any one of the first side terminal 50 and the second side terminal 60 may be provided as an elastic body, or a separate shape change for applying lateral tension may be essentially required.

The term 'lateral tension' may be defined as a force which any one of the first side terminal 50 and the second side terminal 60 transfers to the other of the first and second side terminals in a direction different from a longitudinal direction, in order to prevent the disconnection of the electric flow between the first side terminal 50 and the second side terminal 60, as described above.

The antenna device is characterized in that, when the shape change of the terminal portion 40 is designed, impedance matching design in the terminal insertion port 25 needs to be in parallel. However, the embodiments of the cavity filter in accordance with the present disclosure will be described under the supposition that impedance matching is achieved in the terminal insertion port 25. Therefore, among the components of the embodiments of the cavity filter in accordance with the present disclosure, which will be described with reference to FIG. 4 and the subsequent drawings, the exterior of a reinforcement plate or dielectric body inserted into the terminal insertion port 25 with the terminal portion 40 may have a different shape depending on impedance matching design.

Figure 6:
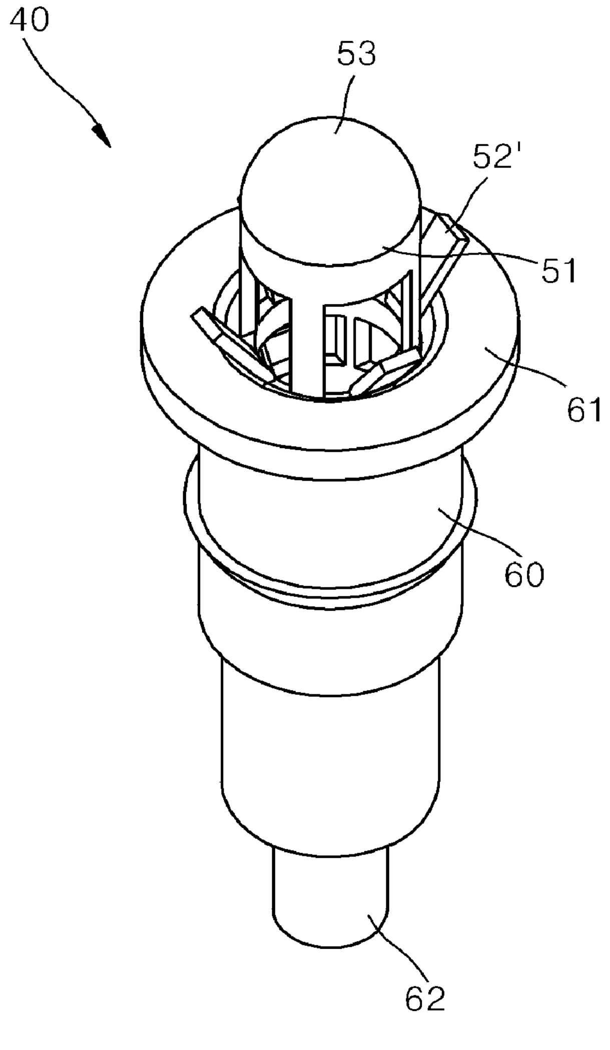
FIG. 6 is a perspective view illustrating a terminal portion among components of FIG. 4.

FIG. 4 is an exploded perspective view illustrating some components of a cavity filter in accordance with a first embodiment of the present disclosure, FIG. 5 is a cross-sectional view illustrating the cavity filter in accordance with the first embodiment of the present disclosure, and FIG. 6 is a perspective view illustrating the terminal portion 40 among the components of FIG. 4.

As illustrated in FIGS. 4 to 6, a cavity filter in accordance with the first embodiment of the present disclosure includes an RF signal connecting portion 31 (FIG. 5) and a terminal portion 40. The RF signal connecting portion 31 is spaced apart, by a predetermined distance, from an outer member 8 having an electrode pad (with no reference numeral) provided on one surface thereof. The terminal portion 40 may electrically connect the electrode pad of the outer member 8 and the RF signal connecting portion 31, and not only absorb assembly tolerance existing at the predetermined distance, but also prevent disconnection of the electric flow between the electrode pad and the RF signal connecting portion 31.

As illustrated in FIG. 2, the outer member 8 may be commonly referred to as any one of an antenna board having antenna elements arranged on the other surface thereof and a PCB board provided as one board on which a PA (Power Amplifier), a digital board and TX calibration are integrated.

Hereafter, as illustrated in FIG. 3, an exterior configuration constituting the embodiments of the cavity filter in accordance with the present disclosure is not divided into first and second cases, but commonly referred to as a "filter body" 21 having a terminal insertion port 25 formed therein.

As illustrated in FIGS. 4 and 5, the terminal insertion port 25 of the filter body 21 may be provided as a hollow space. The terminal insertion port 25 may be formed in different shapes depending on impedance matching design applied to a plurality of embodiments which will be described below.

The filter body 21 may have a washer installation portion 27 formed as a groove on one surface thereof on which a first side terminal 50 (FIG. 4) of the terminal portion 40 to be described below is provided. The washer installation portion 27 may be formed as a groove to have a larger inner diameter than the terminal insertion port 25. Thus, when the outer edge of a star washer 90 which will be described below is locked to the washer installation portion 27, the star washer 90 may be prevented from being separated upward.

Furthermore, the cavity filter in accordance with the first embodiment of the present disclosure may further include the star washer 90 fixedly installed on the washer installation portion 27.

The following descriptions are based on the supposition that the star washer 90 is commonly provided in all the embodiments of the present disclosure, which will be described below, as well as the first embodiment of the present disclosure. Therefore, it should be understood that, although the star washer 90 is not described in detail in the embodiments other than the first embodiment, the star washer 90 (FIG. 5) is included in the embodiments. The star washer 90 may include a fixed edge 91 (FIG. 5) formed in a ring shape and fixed to the washer installation portion 27, and a plurality of support pieces 92 (FIG. 5) which are upwardly inclined from the fixed edge 91 toward the center of the electrode pad of the outer member 8 provided as any one of an antenna board and a PCB board.

When the embodiments of the cavity filter in accordance with the present disclosure are assembled to the outer member 8 provided as any one of the antenna board and the PCB board by an assembler, the star washer 90 may apply an elastic force to a fastening force by a fastening member (not illustrated) through the above-described assembly hole, while the plurality of support pieces 92 are supported on one surface of the outer member 8 provided as any one of an antenna board and a PCB board.

The applying of the elastic force through the plurality of support pieces 92 may make it possible to uniformly maintain a contact area with the electrode pad of the terminal portion 40.

Furthermore, the ring-shaped fixed edge 91 of the star washer 90 may be provided to cover the outside of the terminal portion 40 which is provided to transfer an electric signal, and serve as a kind of ground terminal.

Furthermore, the star washer 90 serves to absorb assembly tolerance existing between the outer members 8 each provided as any one of an antenna board and a PCB board in the embodiments of the cavity filter in accordance with the present disclosure.

However, as will be described below, the assembly tolerance absorbed by the star washer 90 exists in the terminal insertion port 25, and is distinguished from assembly tolerance absorbed by the terminal portion 40. That is, the cavity filter in accordance with the embodiments of the present disclosure may be designed to absorb overall assembly tolerances at two or more locations through separate members during a single assembly process, and thus coupled more stably.

As illustrated in FIGS. 4 to 6, the terminal portion 40 in the cavity filter in accordance with the first embodiment of the present disclosure may include first side terminal 50 (FIG. 4) and the second side terminal 60. The first side terminal 50 may be contacted with the electrode pad of the outer member 8, and the second side terminal 60 may be fixed to a solder hole 32 (FIG. 5) formed in a plate of the RF signal connection portion 31.

Any one of the first side terminal 50 and the second side terminal 60 may be inserted into the other of the first and second side terminals, such that end portions of the respective terminals partially overlap each other by a predetermined length during an assembly process.

In the cavity filter in accordance with the first embodiment of the present disclosure, a lower end portion of the first side terminal 50 may be inserted into a housing space formed in an upper end portion 61 of the second side terminal 60 in the drawings (see FIGS. 4 and 5). For this structure, a lower end portion 62 of the second side terminal 60 may be formed in a hollow pipe shape such that the lower end portion of the first side terminal 50 is inserted into the lower end portion 62 of the second side terminal 60.

More specifically, as illustrated in FIGS. 4 to 6, the cavity filter in accordance with the first embodiment of the present disclosure may include the terminal portion 40 having first side terminal 50 and the second side terminal 60. The first side terminal 50 may be disposed at the top of the terminal insertion port 25 (FIG. 4), and include a contact portion 53 having a contact surface formed at the top thereof, the contact surface being contacted with the electrode pad formed on the outer member 8 configured as any one of an antenna board and a PCB board. The second side terminal 60 may be disposed at the bottom of the terminal insertion port 25, have a structure for housing a part of the first side terminal 50 therein, and include the lower end portion 62 soldered to the solder hole 32 (FIG. 5) formed in the plate of the RF signal connecting portion 31 (FIG. 5).

As illustrated in FIGS. 4 and 5, the contact portion 53 may have a predetermined contact area formed at the tip thereof, and have a hemispherical cross-sectional shape to minimize a contact area with the electrode pad as much as possible.

The first side terminal 50 may further include an upper end portion 51 (FIGS. 4 to 6) and a plurality of cut pieces 52' and 52" formed on the outer circumferential surface thereof and inclined and extended upward externally.

The plurality of cut pieces 52' and 52" may include an elastic cut piece 52' formed on the outer circumferential surface of the first side terminal 50 (FIG. 4) and extended outwardly so as to be locked to the outer circumferential edge of the housing space formed in the upper end portion 61 of the second side terminal 60. At this time, the elastic cut piece 52' may be formed at a higher level on the outer circumferential surface of the first side terminal 50 (FIG. 4) than a lateral tension cut piece 52" which will be described below. The elastic cut piece 52' may be housed in the second side terminal 60 when an assembly force of an assembler is provided. Then, the elastic cut piece 52' may be locked to the upper end portion 61 of the second side terminal 60, corresponding to the top of the housing space, and generate a predetermined elastic force to push the first side terminal 50 upward with respect to the second side terminal 60.

The plurality of cut pieces 52' and 52" may further include the lateral tension cut piece 52" formed on the outer circumferential surface of the first side terminal 50, corresponding to the bottom of the elastic cut piece 52', and housed in the housing space of the second side terminal 60 so as to apply an elastic force in a lateral direction with respect to the inner surface of the housing space.

When the assembly force of the assembler is provided to press the first side terminal 50 downward such that the first side terminal 50 is moved from the outside of the housing space of the second side terminal 60 and housed in the housing space, the elastic cut piece 52' may be elastically deformed so as to be folded toward the outer circumferential surface of the first side terminal 50, and apply an elastic force to push the first side terminal 50 upward with respect to the second side terminal 60, thereby absorbing assembly tolerance existing in the terminal insertion port 25.

Furthermore, the lateral tension cut piece 52" serves to continuously apply lateral tension to the inner surface of the second side terminal 60, thereby preventing disconnection of the electric flow between the first side terminal 50 and the second side terminal 60 which are configured as two separate members.

As illustrated in FIGS. 4 and 5, the cavity filter in accordance with the first embodiment of the present disclosure may further include a reinforcement plate 95 disposed in the terminal insertion port 25 and having a terminal through-hole 97 (FIG. 4) through which the lower end portion 62 of the second side terminal 60 of the terminal portion 40 passes.

When a predetermined assembly force is transferred to the second side terminal 60 while the first side terminal 50 is moved by an assembly force of an assembler and housed in the second side terminal 60, the reinforcement plate 95 serves to reliably support the second side terminal 60, thereby reinforcing the RF signal connecting portion 31 to which the lower end portion 62 of the second side terminal 60 is soldered.

Figure 7:
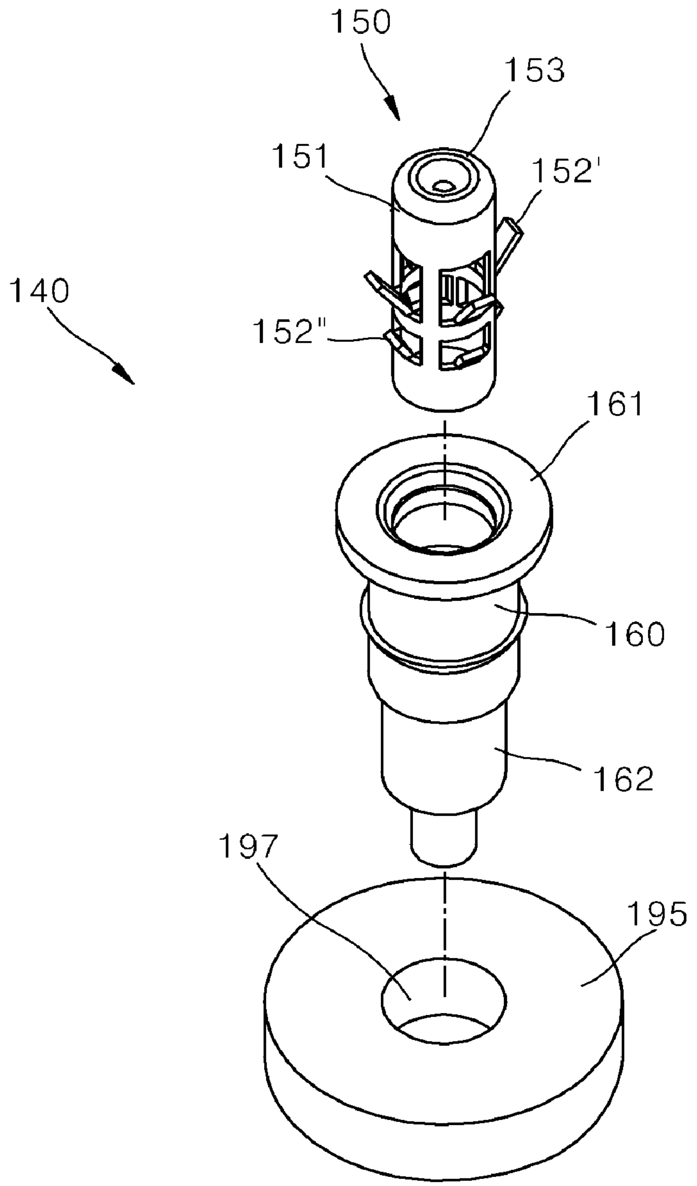
FIG. 7 is an exploded perspective view illustrating a cavity filter in accordance with a second embodiment of the present disclosure.
Figure 8:
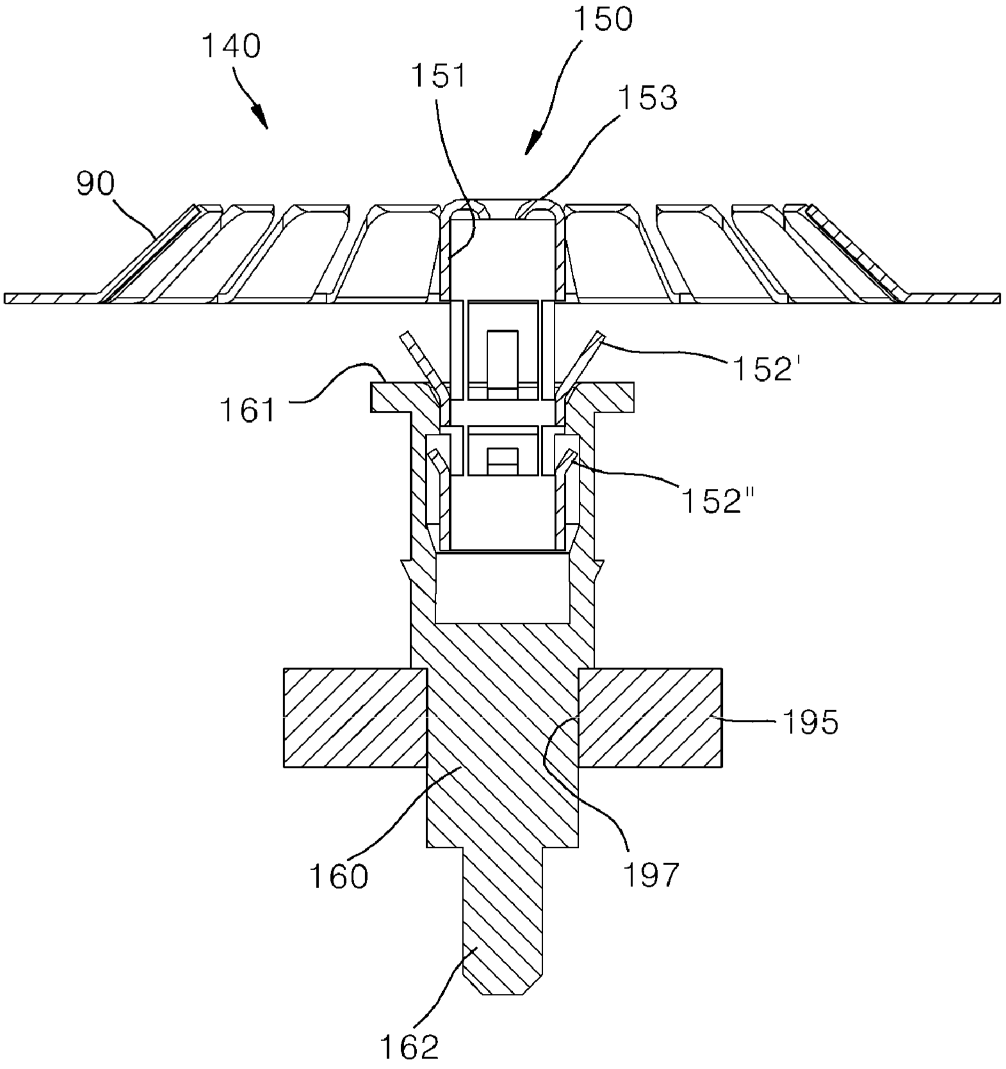
FIG. 8 is a cross-sectional view illustrating the cavity filter in accordance with the second embodiment of the present disclosure.
Figure 9:
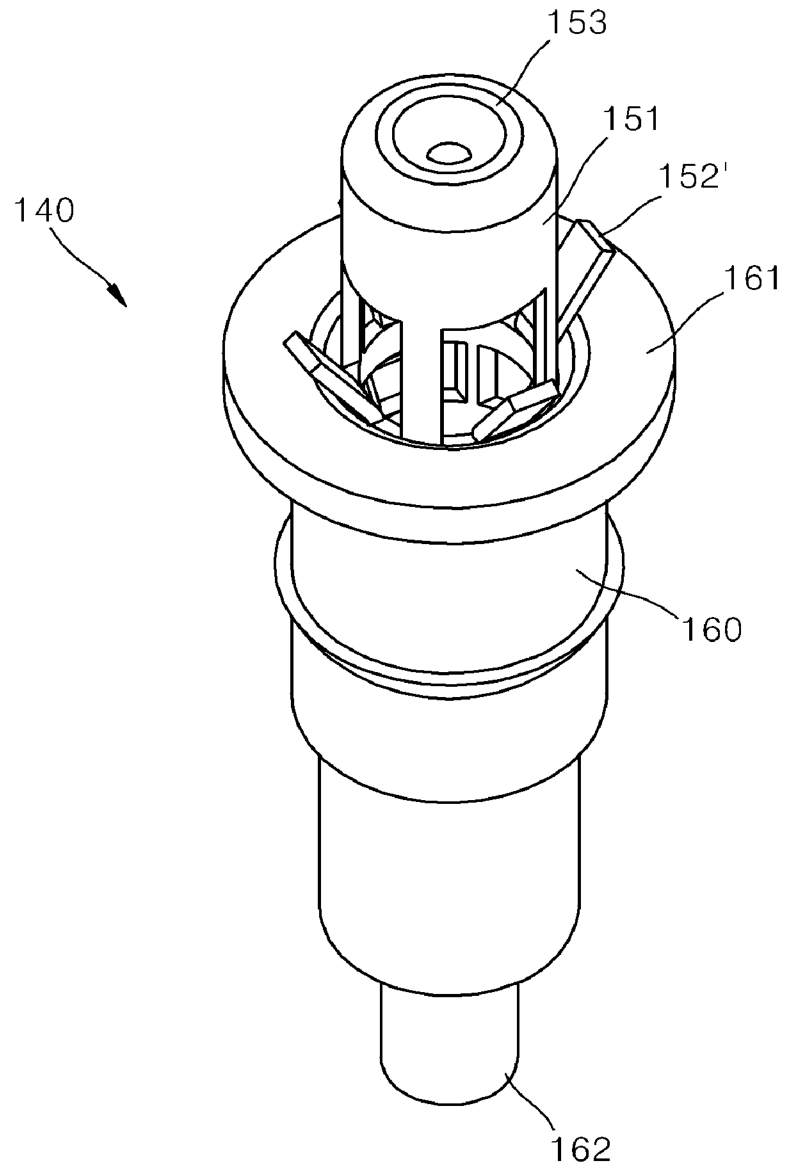
FIG. 9 is a perspective view illustrating a terminal portion among components of FIG. 7.

FIG. 7 is an exploded perspective view illustrating a cavity filter in accordance with a second embodiment of the present disclosure, FIG. 8 is a cross-sectional view illustrating the cavity filter in accordance with the second embodiment of the present disclosure, and FIG. 9 is a perspective view illustrating a terminal portion among components of FIG. 7.

As illustrated in FIGS. 7 to 9, a cavity filter in accordance with the second embodiment of the present disclosure has a structure in which a contact portion 153 formed in an upper end portion 151 of a first side terminal 150 (FIGS. 7 and 8) has a different shape from that of the cavity filter in accordance with the first embodiment.

That is, while the contact portion 153 in the cavity filter in accordance with the first embodiment has a hemispherical cross-sectional shape such that the contact surface thereof is formed in a point contact shape to minimize a contact area, the contact portion 153 in the cavity filter in accordance with the second embodiment has a contact surface formed in a line contact shape (specifically, a contact shape with a ring-shaped cross-section).

The cavity filter in accordance with the second embodiment of the present disclosure may make up for a contact fault of the cavity filter in accordance with the first embodiment due to a point contact.

Since the other shapes and structures of the terminal portion 140 comprising the first side terminal 150 and a second side terminal 160 and the detailed shape and structure of the reinforcement plate 195 (FIGS. 7 and 8) are the same as or similar to those of the first embodiment, the detailed descriptions may be replaced with those of the first embodiment.

For example, the plurality of cut pieces 152' and 152" have the same or similar structures and functions to those of the plurality of cut pieces 52' and 52", respectively, and detailed description thereof will be omitted. Also, the upper end portion 161, the lower end portion 162 and the terminal through-hole 197 have the same or similar structures and functions to those of the upper end portion 61, the lower end portion 62 and the terminal through-hole 97, respectively, and detailed description thereof will be omitted.

Figure 10:
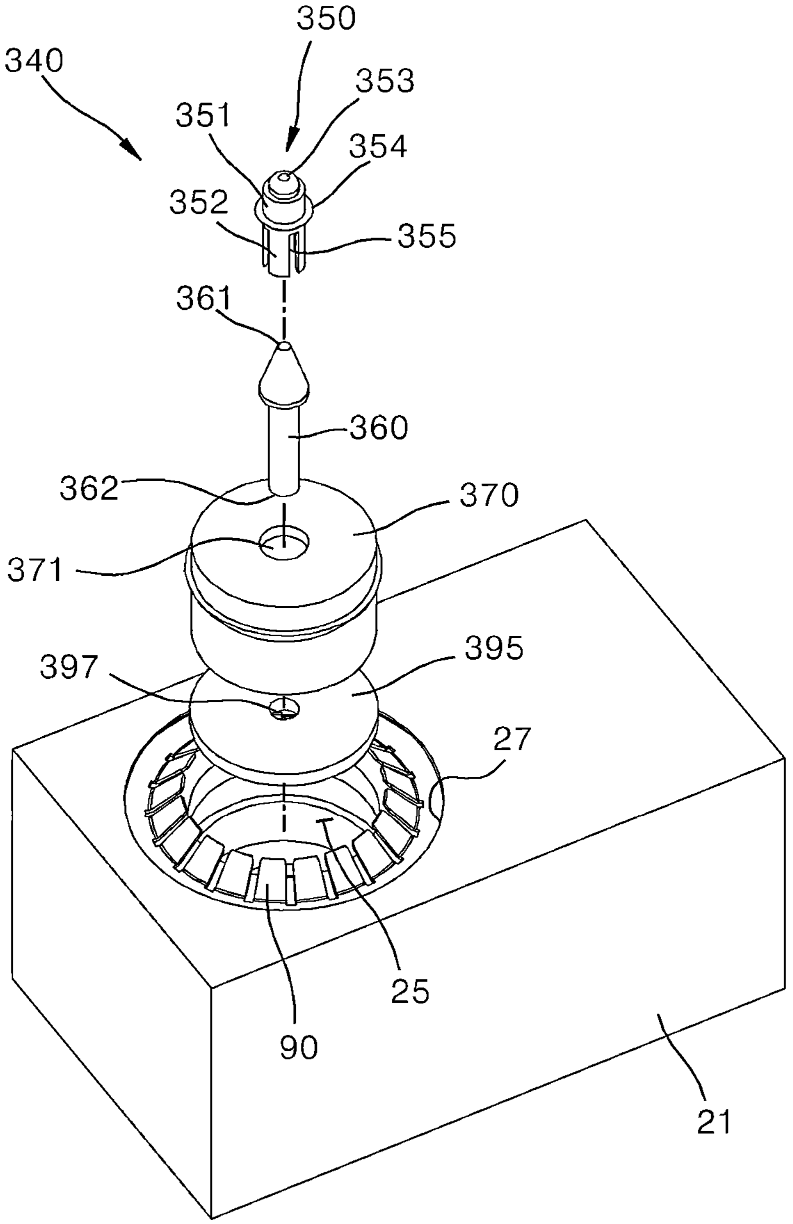
FIG. 10 is an exploded perspective view illustrating a cavity filter in accordance with a third embodiment of the present disclosure.
Figure 11:
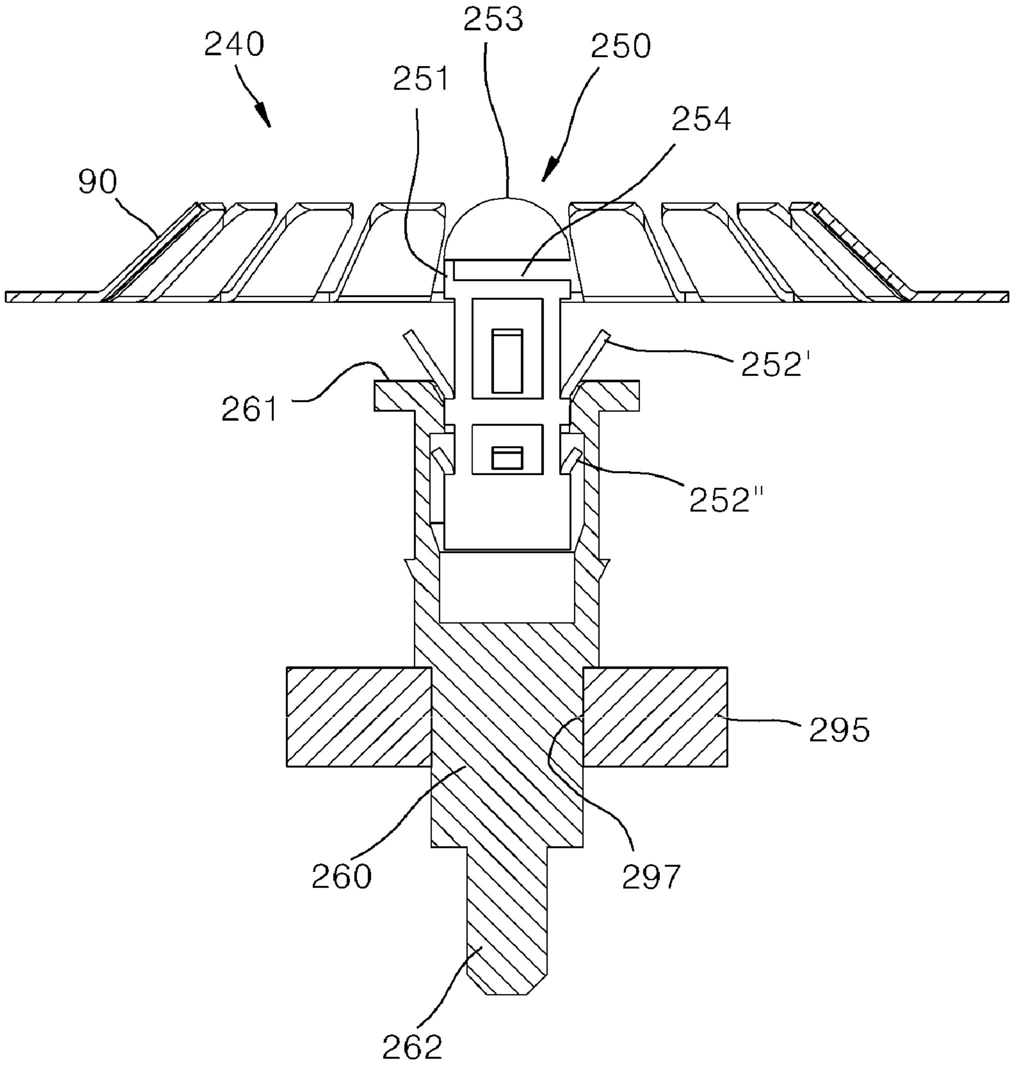
FIG. 11 is a cross-sectional view illustrating the cavity filter in accordance with the third embodiment of the present disclosure.
Figure 12:
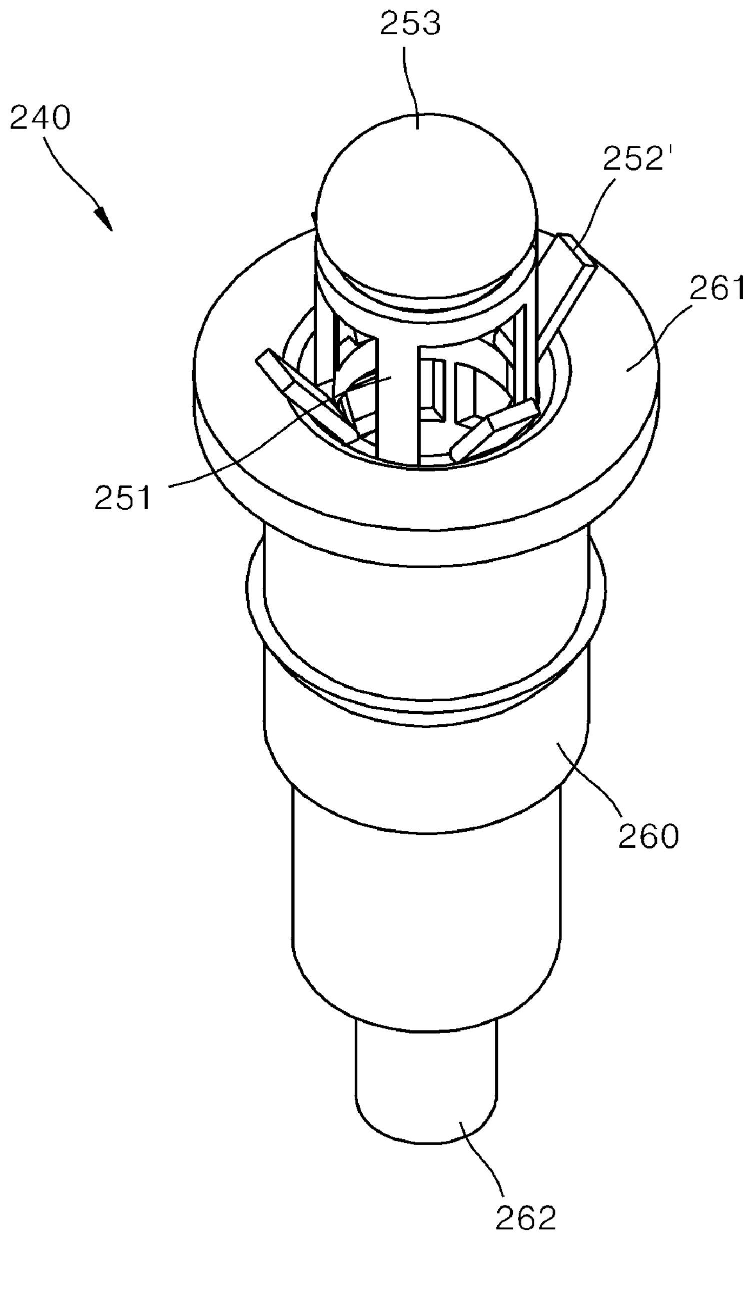
FIG. 12 is a perspective view illustrating a terminal portion among components of FIG. 10.

FIG. 10 is an exploded perspective view illustrating a cavity filter in accordance with a third embodiment of the present disclosure, FIG. 11 is a cross-sectional view illustrating the cavity filter in accordance with the third embodiment of the present disclosure, and FIG. 12 is a perspective view illustrating a terminal portion among components of FIG. 10.

As illustrated in FIGS. 10 to 12, a cavity filter in accordance with the third embodiment of the present disclosure has a structure in which an upper end portion of a first side terminal 250 (FIGS. 10 and 11) has a different shape from that of the cavity filter in accordance with the first embodiment.

That is, while the upper end portion 251 of the first side terminal 250 in the cavity filter in accordance with the first embodiment is made of a rigid material which is not elastically deformed even though an assembly force is provided by an assembler, the upper end portion of the first side terminal 250 in the cavity filter in accordance with the third embodiment may have a cut groove 254 (FIGS. 10 and 11) which can be folded downward when an assembly force of an assembler is provided through a contact portion 253 serving as the upper end portion of the first side terminal 250.

In the cavity filter in accordance with the third embodiment of the present disclosure, when an assembly force of an assembler is provided through the contact portion 253, an upper end portion 251 of the first side terminal 250 may be pressed downward by the height of the cut groove 254 and elastically deformed to compensate for the function of an elastic cut piece 252' among the components of the cavity filter in accordance with the third embodiment. The component 252" has the same or similar functions and structures as those of the component 52", and detailed description thereof is omitted herein.

Since the other shapes and structures of the first side terminal 250 and a second side terminal 260 and the detailed shape and structure of the reinforcement plate 295 (FIGS. 10 and 11) are the same as or similar to those of the first embodiment, the detailed descriptions thereof will be omitted herein.

For example, the terminal portion 240, the upper end portion 261 and the lower end portion 262 have the same or similar structures and functions to those of the terminal portion 40, the upper end portion 61 and the lower end portion 62, respectively, and detailed description thereof will be omitted. Also, the elastic cut pieces 152", the terminal through-hole 297 and the reinforcement plate 295 have the same or similar structures and functions to those of the elastic cut pieces 52", the terminal through-hole 97 and the reinforcement plate 95, respectively, and detailed description thereof will be omitted.

Figure 13:
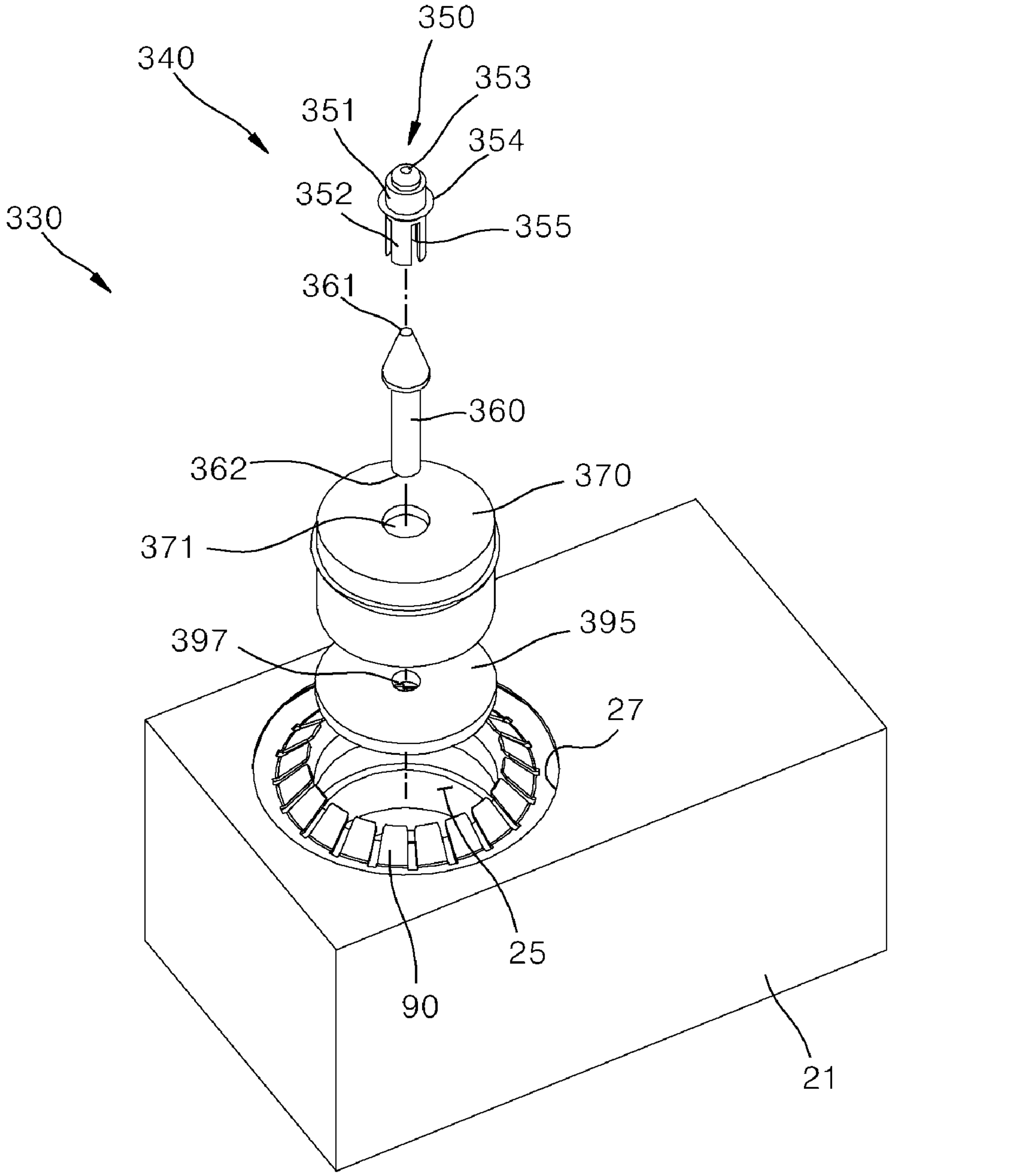
FIG. 13 is an exploded perspective view illustrating a cavity filter in accordance with a fourth embodiment of the present disclosure.
Figure 14:
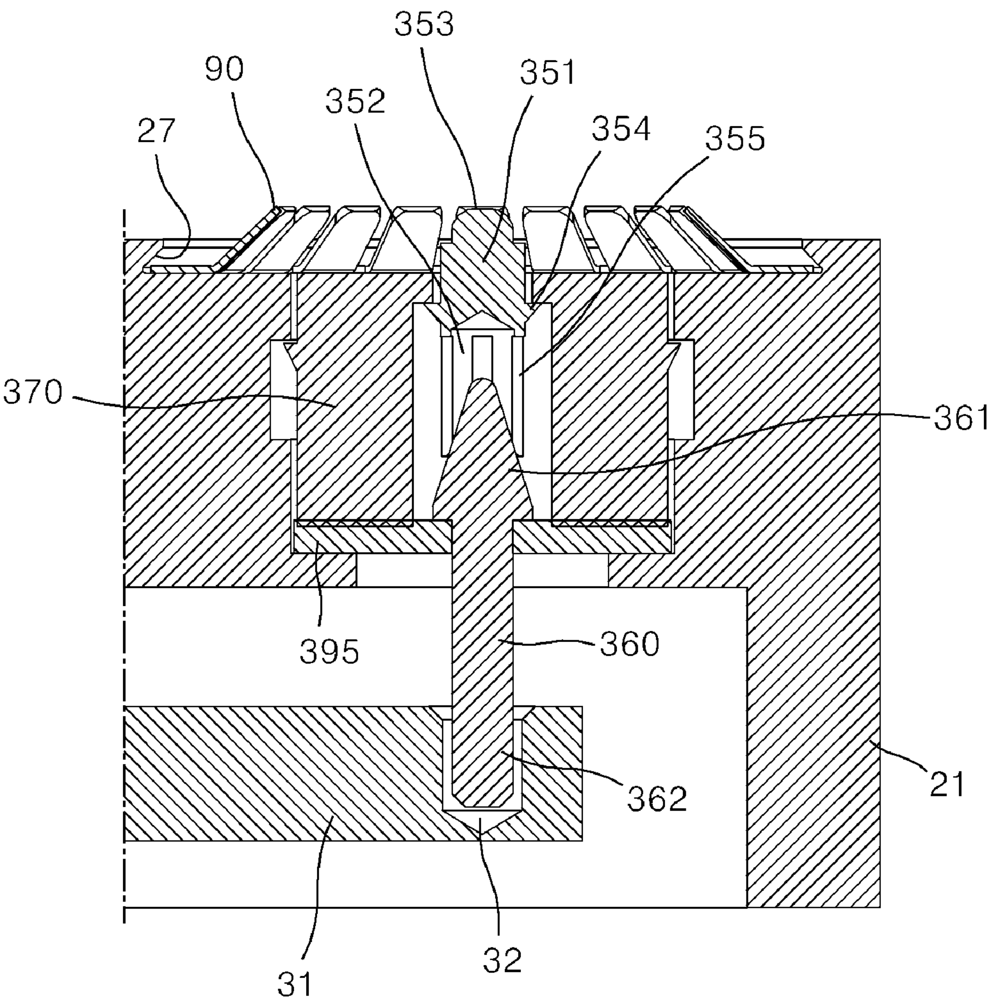
FIG. 14 is a cross-sectional view illustrating the cavity filter in accordance with the fourth embodiment of the present disclosure.
Figure 15:
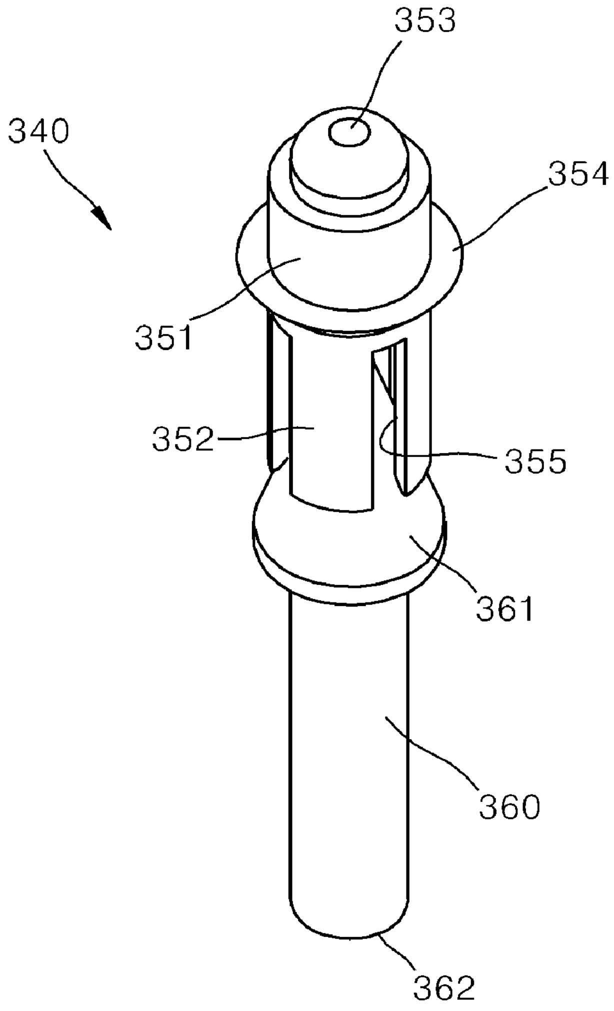
FIG. 15 is a perspective view illustrating a terminal portion among components of FIG. 13.

FIG. 13 is an exploded perspective view illustrating a cavity filter in accordance with a fourth embodiment of the present disclosure, FIG. 14 is a cross-sectional view illustrating the cavity filter in accordance with the fourth embodiment of the present disclosure, and FIG. 15 is a perspective view illustrating a terminal portion among components of FIG. 13.

As illustrated in FIGS. 13 to 15, a cavity filter 330 in accordance with the fourth embodiment of the present disclosure may include a terminal portion 340 (FIGS. 13 and 15) having a first side terminal 350 (FIG. 13) and a second side terminal 360. The first side terminal 350 may be disposed at the top of a terminal insertion port 25 (FIG. 13), and include a contact portion 353 and tension cut portions 355. The contact portion 353 may have a contact surface formed at the top thereof, the contact surface being contacted with an electrode pad formed on an outer member 8 configured as any one of an antenna board and a PCB board, and the tension cut portions 355 may be formed at the lower end portion 352 formed in a hollow pipe shape, such that the bottoms of the lower end portion 352 are widened by an external force. The second side terminal 360 may be disposed at the bottom of the terminal insertion port 25, and include an upper end portion 361 whose part is inserted into the lower end portion 352 of the first side terminal 350, and a lower end portion 362 soldered and fixed to a solder hole 32 (FIG. 14) formed in the plate of an RF signal connecting portion 31 (FIG. 14).

As illustrated in FIGS. 13 and 15, the upper end portion 361 of the second side terminal 360 may be formed approximately in a cone shape in which the top thereof has an outer diameter which can be inserted into the lower end portion 352 of the first side terminal 350 formed in a hollow pipe shape, and the bottom thereof has a larger diameter than the lower end portion 352 of the first side terminal 350.

Therefore, when the first side terminal 350 is pressed downward by an assembly force provided by an assembler, the lower end portion 352 of the first side terminal 350 is widened along the outer surface of the upper end portion 361 of the second side terminal 360 by the tension cut portions 355 formed in the lower end portion of the first side terminal 350, and applies an elastic force to push the first side terminal 350 upward with respect to the second side terminal 360 while applying lateral tension toward the outer surface of the upper end portion 361 of the second side terminal 360.

The cavity filter in accordance with the fourth embodiment of the present disclosure, which has the above-described configuration, may absorb assembly tolerance in the terminal insertion port 25 through the shape matching design between the tension cut portions 355 formed in the lower end portion of the first side terminal 350 and the upper end portion 361 of the second side terminal 360, and simultaneously prevent disconnection of an electric flow through the application of lateral tension.

As illustrated in FIGS. 13 and 14, the cavity filter in accordance with the fourth embodiment of the present disclosure may further include a dielectric body 370 and a reinforcement plate 395. The dielectric body 370 may be inserted and disposed in the terminal insertion port 25 (FIG. 13), and used for impedance matching design in the relationship with the terminal portion 340 (FIG. 13), and the reinforcement plate 395 may fix the second side terminal 360 of the terminal portion 340 into the terminal insertion port 25, and thus reinforce the RF signal connecting portion 31 (FIG. 14).

The dielectric body 370 and the reinforcement plate 395 may have respective terminal through-holes 371 and 397, as shown in FIG. 13, through which the first side terminal 350 and the second side terminal 360 pass.

The upper end portion 351 and the cut groove 354 have the same or similar structures and functions to those of the upper end portion 251 and the cut groove 254, respectively, and detailed description thereof will be omitted.

Figure 16:
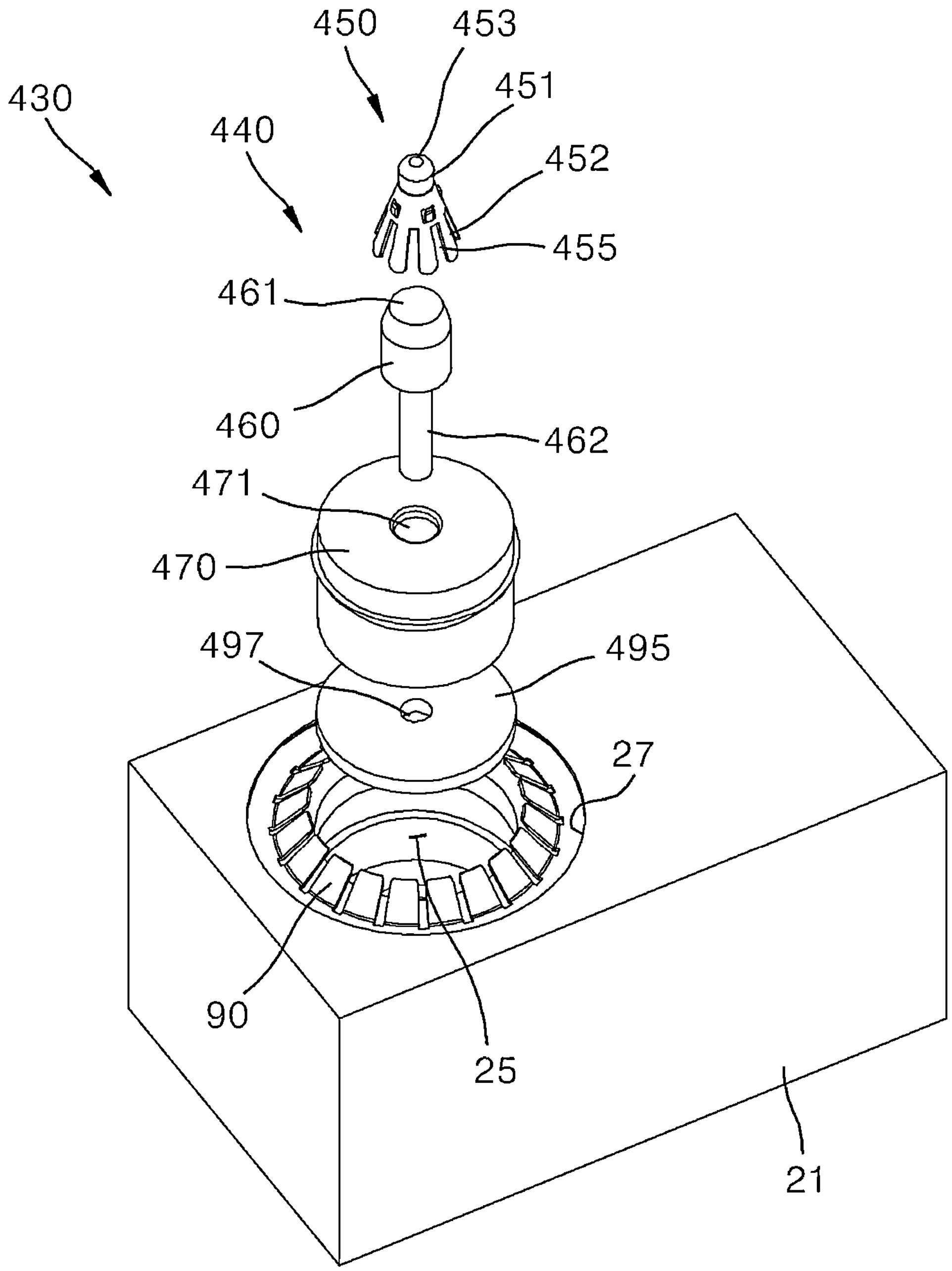
FIG. 16 is an exploded perspective view illustrating a cavity filter in accordance with a fifth embodiment of the present disclosure.
Figure 17:
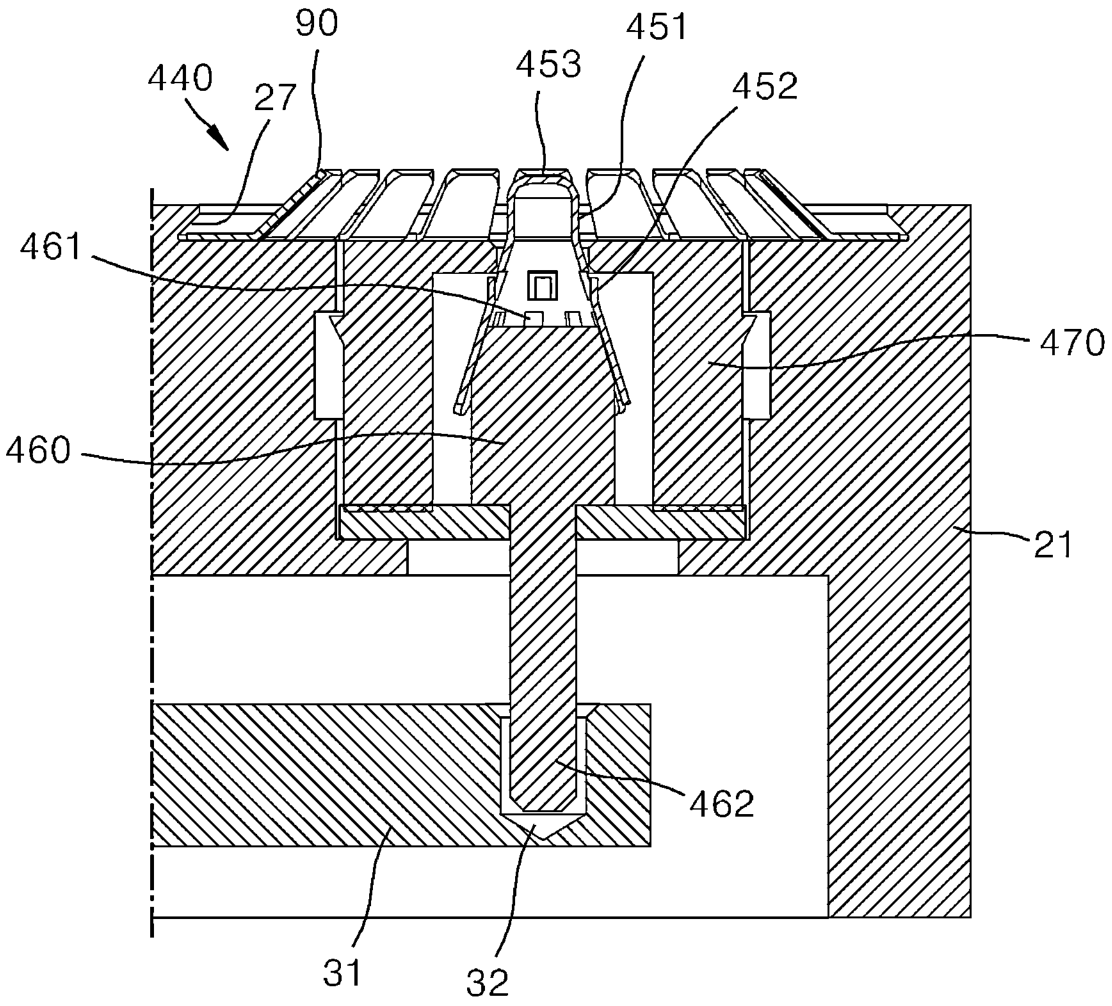
FIG. 17 is a cross-sectional view illustrating the cavity filter in accordance with the fifth embodiment of the present disclosure.
Figure 18:
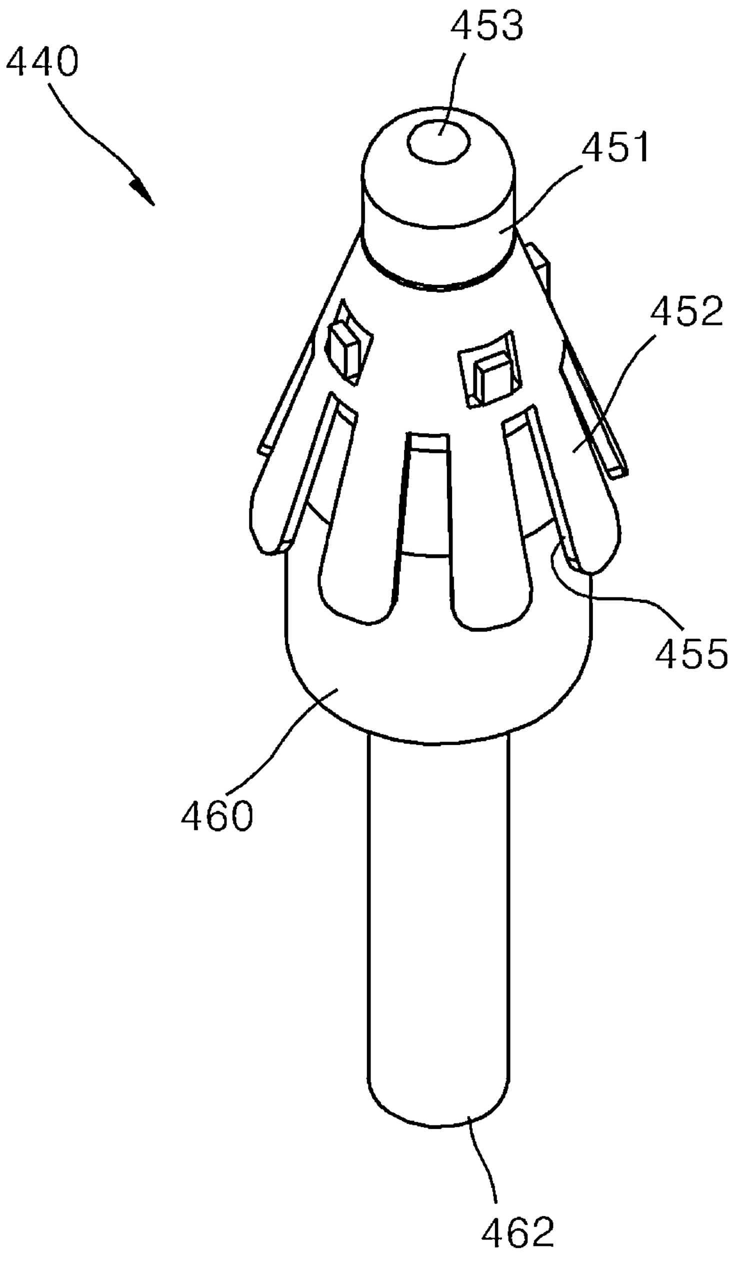
FIG. 18 is a perspective view illustrating a terminal portion among components of FIG. 16.

FIG. 16 is an exploded perspective view illustrating a cavity filter in accordance with a fifth embodiment of the present disclosure, FIG. 17 is a cross-sectional view illustrating the cavity filter in accordance with the fifth embodiment of the present disclosure, and FIG. 18 is a perspective view illustrating a terminal portion among components of FIG. 16.

As illustrated in FIGS. 16 to 18, a cavity filter 430 in accordance with the fifth embodiment of the present disclosure may have a cross-section in which a terminal portion 440 comprising a lower end portion 452 of a first side terminal 450 (FIG. 16) having tension cut portions 455 (FIGS. 16 and 18) therein is downwardly inclined at a predetermined angle externally, compared to the cavity filter in accordance with the fourth embodiment.

An upper end portion 461 (FIGS. 16 and 17) of the second side terminal 460 may be formed in a shape obtained by horizontally cutting a part of a cone-shaped upper end portion of the cavity filter in accordance with the fourth embodiment.

Since the other shapes and structures of the first side terminal 450 (FIG. 16) and a second side terminal 460 and the detailed shapes and structures of a dielectric body 470 (FIGS. 16 and 17) and a reinforcement plate 495 (FIG. 16) are the same as or similar to those of the fourth embodiment, the detailed descriptions thereof may be replaced with those of the first embodiment.

The various embodiments of the present disclosure, which have the above-described configuration, may adopt the elastically deformable terminal portion 40 (as in FIG. 4) or a separate elasticity application structure, and thus not only absorb assembly tolerance in the terminal insertion port 25 (as in FIG. 4), but also apply a continuous elastic force, thereby securing contact performance with respect to the electrode pad. Furthermore, a part of the terminal portion 40 (as in FIG. 4) may be cut to prevent disconnection of an electric flow, thereby preventing degradation in performance of the antenna device. Components 451, 453, 462 have the same or similar functions and structures as those of components 51, 53, 62, and detailed description thereof is omitted herein. Also, Components 430, 471, 497 have the same or similar functions and structures as those of components 330, 371, 397, and detailed description thereof is omitted herein.

Figure 19:
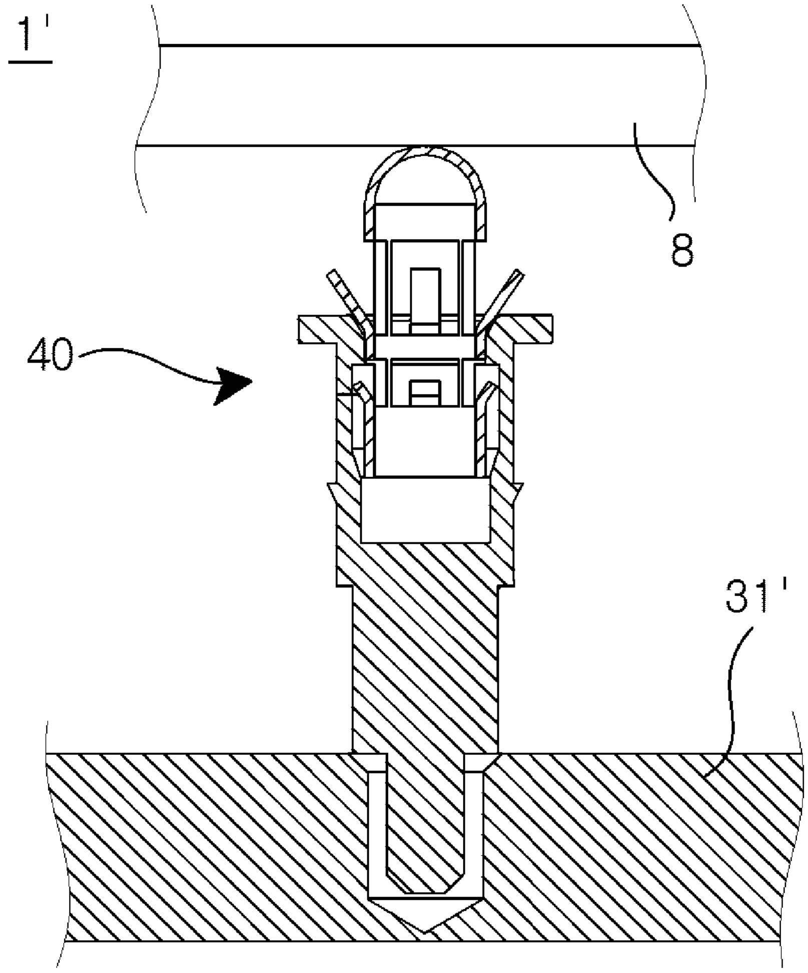
FIG. 19 is a cross-sectional view illustrating a connecting structure in accordance with an embodiment of the present disclosure.

FIG. 19 is a cross-sectional view illustrating a connecting structure in accordance with an embodiment of the present disclosure.

So far, it has been described that each of the cavity filters in accordance with the various embodiments of the present disclosure is manufactured as one module, and attached to one surface of the outer member 8 provided as an antenna board or a PCB board. However, the embodiments of the present disclosure are not necessarily limited thereto. According to a modification illustrated in FIG. 19, the cavity filter may be implemented as a connecting structure 1' including the terminal portion 40 which is provided between the electrode pad provided on one surface of the outer member 8 and another connection member 31', and makes an electrical connection with the connection member 31', regardless of whether the cavity filter is manufactured in the form of a module.

The above-described contents are only exemplary descriptions of the technical idea of the present disclosure, and those skilled in the art to which the present disclosure pertains may change and modify the present disclosure in various manners without departing from the essential properties of the present disclosure.

Therefore, the embodiments disclosed in the present disclosure do not limit, but describe the technical idea of the present disclosure, and the scope of the technical idea of the present disclosure is not limited by the embodiments. The scope of the protection of the present disclosure should be construed by the following claims, and all technical ideas within a range equivalent to the claims should be construed as being included in the scope of rights of the present disclosure.

INDUSTRIAL APPLICABILITY

The present disclosure provides a cavity filter which can have a slimmer and more compact structure because an RF connector is embedded in the filter body in the thickness direction thereof, be assembled through an assembly method capable of minimizing the accumulation amount of assembly tolerance which occurs when a plurality of filters are assembled, facilitate the RF signal connection structure to be easily mounted and uniformly maintain the frequency characteristics of the filters, and provide stable connection by applying lateral tension while allowing a relative motion, thereby preventing degradation in antenna performance, and a connecting structure included therein.

The invention claimed is:

1. A connecting structure comprising:
- an RF signal connecting portion spaced apart, by a predetermined distance, from an outer member having an electrode pad provided on a surface thereof; and
- a terminal portion configured to electrically connect the electrode pad of the outer member and the RF signal connecting portion,
- wherein the terminal portion comprises:
- a first side terminal which is in contact with the electrode pad; and
- a second side terminal connected to the RF signal connecting portion,
- wherein at least one of the first side terminal and the second side terminal has a housing space in which the other of the first side terminal and the second side terminal is housed, and a part of the at least one side terminal of the first side terminal and the second side terminal is elastically deformable, and
- wherein the second side terminal has the housing space in which a part of the first side terminal is housed.

2. A cavity filter comprising:
- an RF signal connecting portion spaced apart, by a predetermined distance, from an outer member having an electrode pad provided on a surface thereof; and
- a terminal portion configured to electrically connect the electrode pad of the outer member and the RF signal connecting portion,
- wherein the terminal portion comprises:
- a first side terminal which is in contact with the electrode pad; and
- a second side terminal connected to the RF signal connecting portion,
- wherein at least one of the first side terminal and the second side terminal has a housing space in which the other of the first side terminal and the second side terminal is housed, and a part of the at least one side terminal of the first side terminal and the second side terminal is elastically deformable,
- wherein the second side terminal has the housing space in which a part of the first side terminal is housed.

3. The cavity filter of claim 2, wherein the first side terminal has a plurality of cut pieces formed at an outer circumferential surface thereof, and inclined and extended upwardly and outwardly.

4. The cavity filter of claim 3, wherein the plurality of cut pieces comprise:
- an elastic cut piece formed at an upper portion of the outer circumferential surface of the first side terminal, and extended outwardly so as to be locked to an outer circumferential edge of the housing space formed in the second side terminal; and
- a tension cut piece formed at a lower portion of the outer circumferential surface of the first side terminal, and housed in the housing space of the second side terminal so as to apply an elastic force in a lateral direction with respect to an inner surface of the housing space.

5. The cavity filter of claim 4, wherein the tension cut piece is formed to apply continuous tension to the inner surface of the housing space.

6. The cavity filter of claim 2, wherein a contact portion of the first side terminal, which is in contact with the electrode pad, has a hemispherical cross-sectional shape.

7. The cavity filter of claim 2, wherein a contact portion of the first side terminal, which is in contact with the electrode pad, has a ring-shaped cross-sectional shape.

8. The cavity filter of claim 2, wherein an upper end portion of the first side terminal has a cut groove which is foldable by an external force.

9. A cavity filter comprising:

an RF signal connecting portion spaced apart, by a predetermined distance, from an outer member having an electrode pad provided on a surface thereof; and a terminal portion configured to electrically connect the electrode pad of the outer member and the RF signal connecting portion, wherein the terminal portion comprises:

a first side terminal which is in contact with the electrode pad; and a second side terminal connected to the RF signal connecting portion, wherein at least one of the first side terminal and the second side terminal has a housing space in which the other of the first side terminal and the second side terminal is housed, and a part of the at least one side terminal of the first side terminal and the second side terminal is elastically deformable, wherein an upper end portion of the second side terminal is housed in a lower end portion of the first side terminal, and the first side terminal has tension cut portions formed therein so as to be widened along an outer surface of the upper end portion of the second side terminal when the first side terminal is moved downward by an external force.

10. The cavity filter of claim 9, wherein the upper end portion of the second side terminal is formed in a cone shape.

11. The cavity filter of claim 10, wherein the upper end portion of the second side terminal is formed in a shape obtained by cutting out a part of the upper end portion.

* * * * *